United States Patent
Tsuji et al.

(10) Patent No.: US 11,529,866 B2
(45) Date of Patent: Dec. 20, 2022

(54) VEHICLE COOLER

(71) Applicant: TOYOTA JIDOSHA KABUSHIKI KAISHA, Toyota (JP)

(72) Inventors: Kyoshiro Tsuji, Toyota (JP); Ryotaro Takami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 927 days.

(21) Appl. No.: 16/274,358

(22) Filed: Feb. 13, 2019

(65) Prior Publication Data

US 2019/0255935 A1  Aug. 22, 2019

(30) Foreign Application Priority Data

Feb. 20, 2018 (JP) .............................. JP2018-027684

(51) Int. Cl.
*B60K 11/08* (2006.01)
*B60H 1/00* (2006.01)
*B60K 11/06* (2006.01)

(52) U.S. Cl.
CPC .......... *B60K 11/08* (2013.01); *B60H 1/00328* (2013.01); *B60K 11/06* (2013.01)

(58) Field of Classification Search
CPC ........... B60K 11/04; B60K 11/08; F01P 11/10
See application file for complete search history.

(56) References Cited

U.S. PATENT DOCUMENTS

| | | | | |
|---|---|---|---|---|
| 5,219,016 A * | 6/1993 | Bolton | .................... | F28F 9/002 |
| | | | | 165/41 |
| 5,269,264 A * | 12/1993 | Weinhold | ............. | B60K 11/085 |
| | | | | 123/198 E |
| 5,526,872 A * | 6/1996 | Gielda | ................... | B60K 11/02 |
| | | | | 123/41.49 |
| 6,302,228 B1 * | 10/2001 | Cottereau | .............. | B60K 11/08 |
| | | | | 180/68.1 |
| 2007/0169455 A1 * | 7/2007 | Umemoto | .............. | B60K 11/04 |
| | | | | 56/14.7 |

(Continued)

FOREIGN PATENT DOCUMENTS

| | | | | |
|---|---|---|---|---|
| FR | 2783766 A1 * | 3/2000 | ............. | B60K 11/08 |
| FR | 2982200 A1 * | 5/2013 | ............. | B60K 11/08 |

(Continued)

OTHER PUBLICATIONS

English machine translation from ESPACENET of Description for JP-2006298190-A (Year: 2021).*

(Continued)

*Primary Examiner* — Michael A Kessler
(74) *Attorney, Agent, or Firm* — Oblon, McClelland, Maier & Neustadt, L.L.P.

(57) ABSTRACT

A vehicle cooler includes a radiator, a condenser, and an air guide bridging from a top surface of the radiator over a top surface of the condenser. The air guide includes a body part including a first base face placed on the top surface of the condenser, a second base face placed on the top surface of the radiator, and a standing wall extending in a height direction of a vehicle for coupling the first base face and the second base face. The standing wall faces a front surface of the radiator with respect to a forward-rearward direction of the vehicle, and includes air holes for guiding outside air to the radiator.

3 Claims, 3 Drawing Sheets

(56) References Cited

U.S. PATENT DOCUMENTS

2008/0035400 A1* 2/2008 Wong .................... B60K 11/08
                                                    180/68.1
2016/0207419 A1* 7/2016 Ohashi ................... B60L 50/71

FOREIGN PATENT DOCUMENTS

| JP | S579610       | * | 1/1982  |            |
|----|---------------|---|---------|------------|
| JP | S5829574      | * | 2/1983  | F01P 11/10 |
| JP | 59070226 A    | * | 4/1984  | B60K 11/08 |
| JP | 9-193673 A    |   | 7/1997  |            |
| JP | 2006298190 A  | * | 11/2006 |            |
| JP | 2008-155739   |   | 7/2008  |            |
| JP | 2015-13580 A  |   | 1/2015  |            |

OTHER PUBLICATIONS

English machine translation from ESPACENET of Description for JP 09193673 A (Year: 2021).*

* cited by examiner

VEHICLE COOLER

CROSS REFERENCE TO RELATED APPLICATION

This application claims priority to Japanese Patent Application No. 2018-027684 filed on Feb. 20, 2018, which is incorporated herein by reference in its entirety including the specification, claims, drawings, and abstract.

TECHNICAL FIELD

The present disclosure relates to a vehicle cooler disposed in a power unit chamber of an automobile and including a condenser and a radiator.

BACKGROUND

An automobile includes, in a front portion, a power unit chamber including power units (e.g., an engine, a motor) for generating driving power. The power unit chamber further includes a vehicle cooler in addition to the power units. The vehicle cooler includes, for example, a radiator for cooling a coolant of the engine and a condenser for cooling a high pressure refrigerant for air conditioner. Typically, the condenser having a lower temperature than the radiator is disposed in front of the radiator in a vehicle.

To prevent the hot air generated around the power units from flowing forward of the condenser and the radiator, a component called an air guide is proposed to surround the condenser and the radiator.

Patent Document 1, for example, discloses an air guide for a vehicle, including an upper air guide disposed above a condenser and a radiator, and side air guides disposed on sides of the condenser and the radiator. In Patent Document 1, the top surface of the condenser t and the top surface of the radiator are located at the same height, and the upper air guide having a substantially planar shape, is disposed to bridge over these two top surfaces. This upper air guide prevents hot air generated around the power units from flowing into the forward portion of the condenser and the like.

CITATION LIST

Patent Literature

Patent Document 1: JP 2008-155739 A

The condenser and the radiator do not always have their top surfaces at the same height, and the top surface of the radiator is sometimes located higher than the top surface of the condenser. In this structure, the upper air guide having a planar shape as disclosed in Patent Document 1 does not lie across the top surface of the condenser and the top surface of the radiator.

One possible solution to address the disadvantage would be to form the upper air guide in a step shape that conforms to the condenser and the radiator having different heights, and more specifically to form the upper air guide to have a standing wall standing in the height direction in the middle of the air guide. The air guide simply having this stepped shape, however, still suffers from problems; such a standing wall covers a part of the front surface of the radiator to prevent the part from being exposed to the outside air. This may lower the cooling efficiency of the radiator.

SUMMARY

The present disclosure therefore provides a vehicle cooler which prevents a reduction in the cooling efficiency of the radiator.

In accordance with an aspect of the disclosure, a vehicle cooler includes a radiator, a condenser disposed in front of the radiator and having a top surface located lower than a top surface of the radiator; and an air guide extending from the top surface of the radiator over the top surface of the condenser. The air guide includes a body part including a first base face placed on the top surface of the condenser, a second base face placed on the top surface of the radiator, and a standing wall extending in a height direction of a vehicle to couple the first base face and the second base face and facing a front surface of the radiator in a forward-rearward direction of the vehicle. The standing wall includes at least one air hole configured to guide the outside air to the radiator.

This structure allows the front surface of the radiator to be exposed to the outside air through the air hole, thereby preventing a reduction in the cooling efficiency of the radiator.

The vehicle cooler may further include a radiator support disposed above the top surface of the radiator and the top surface of the condenser such that the radiator support is spaced from the top surfaces with a gap between the radiator support and the top surfaces. The air guide may further include a first sealing member disposed on the second base face and extending in a width direction of the vehicle. The first sealing member may include an elastic material to fill a gap between the body part and the radiator support.

The first sealing member prevents the hot air flowing forward from the rearward part of the vehicle from passing through the gap between the body part and the radiator support. This structure further prevents the hot air from entering the forward portion of the radiator and the condenser to thereby further increase the cooling efficiency of the vehicle cooler.

The air guide may further include second sealing members extending in the forward-rearward direction of the vehicle in portions of the body part near both ends in the width direction of the vehicle. The second sealing members may include an elastic material to fill a gap between the body part and the radiator support.

The second sealing member blocks the hot air flowing from sideward through the gap between the body part and the radiator support. This structure also further increases the cooling efficiency of the vehicle cooler.

The at least one air hole may include a plurality of air holes, and the standing wall may include the plurality of air holes arranged at intervals in the width direction of the vehicle. The standing wall may include a rib protruding in the forward-rearward direction of the vehicle between adjacent air holes.

This structure enhances the strength of the body part and further increases the area of the air holes, which results in an enhancement in the cooling efficiency of the radiator.

The standing wall may be inclined gradually forward as it extends downward from a front end of the second base face.

The standing wall which is inclined further increases the area of the air holes formed in the standing wall. This also results in an increase in the cooling efficiency of the radiator.

The vehicle cooler of the present disclosure allows the front surface of the radiator to be exposed to the outside air through the air holes to thereby prevent a reduction in the cooling efficiency of the radiator.

BRIEF DESCRIPTION OF DRAWINGS

An embodiment of the present disclosure will be described by reference to the following figures, wherein.

DESCRIPTION OF EMBODIMENTS

Figure 1:
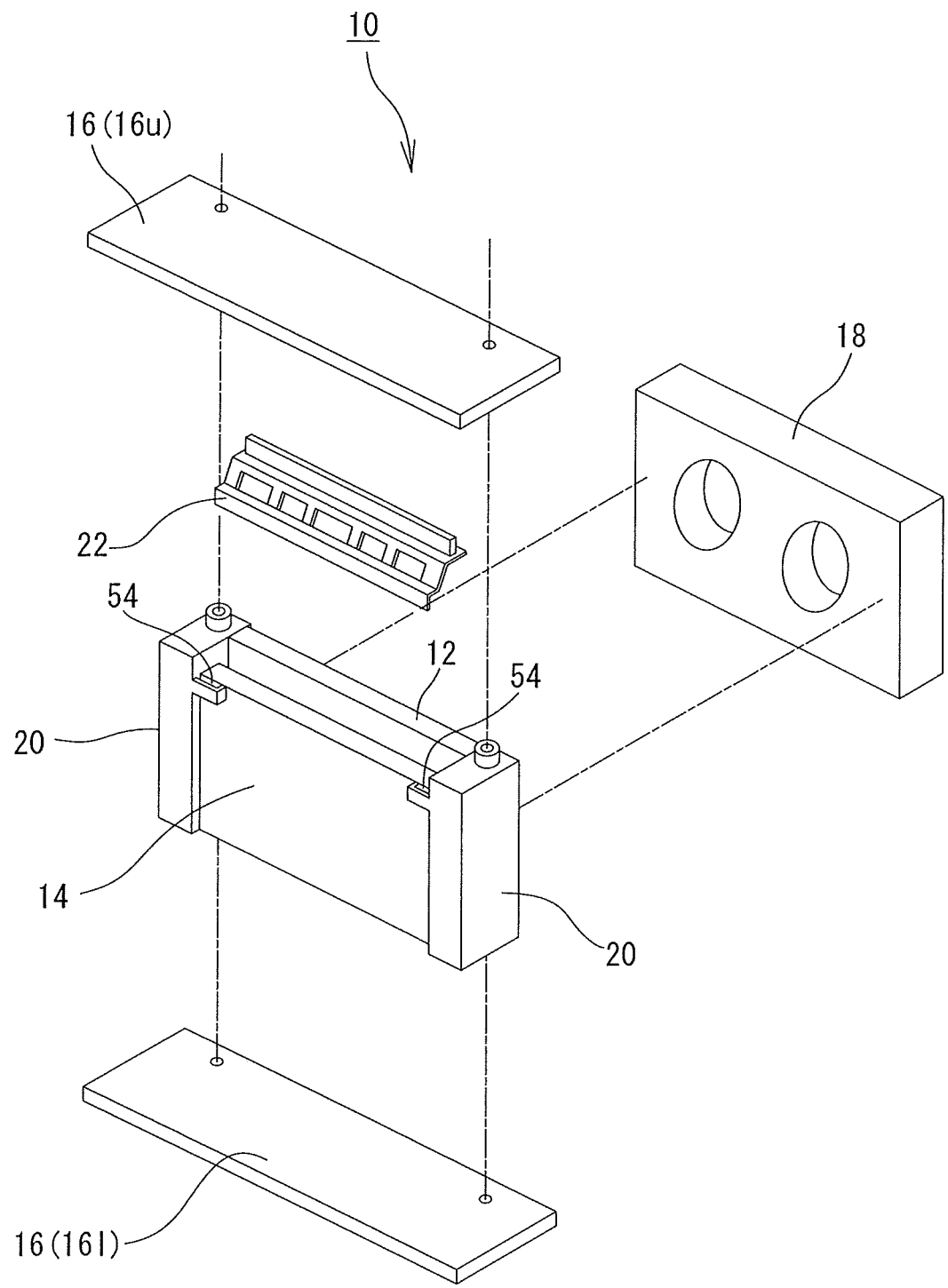
FIG. 1 is a schematic exploded perspective view of a vehicle cooler.

The structure of a vehicle cooler 10 will be described with reference to the drawings. FIG. 1 is a schematic exploded perspective view of the vehicle cooler 10.

The vehicle cooler 10 is disposed in a power unit chamber of an automobile. The power unit chamber is a space in a front portion of a vehicle, and houses various power units (not shown) for generating driving power. The power units include an engine, a motor for travelling, and other components. These power units generate heat in the course of producing the driving power, thereby generating hot air around the power units.

The power unit chamber has a front end face which is segmented by a front bumper having a front grill (both not shown). The front grill is an opening to guide the outside air into the power unit chamber, and includes grating holes formed in the longitudinal range in the vehicle width direction.

The vehicle cooler 10 is disposed between the front grill and the power units. The vehicle cooler 10 includes at least two heat exchangers; that is, a condenser 14 and a radiator 12. The condenser 14 typically cools with the outside air a high pressure refrigerant used for an air-conditioner. The radiator 12 typically cools with the outside air a coolant used for cooling the engine.

The condenser 14 has a substantially rectangular parallelepiped shape which is elongated in the vehicle width direction and is thin in the vehicle forward-rearward direction. The radiator 12, similar to the condenser 14, has a substantially rectangular parallelepiped shape which is elongated in the vehicle width direction and is thin in the vehicle forward-rearward direction. The condenser 14 and the radiator 12 have substantially the same dimension in the vehicle width direction. However, the radiator 12 has a greater height dimension than the condenser 14, and the top surface of the radiator 12 is located at a higher position than the top surface of the condenser 14.

The condenser 14 and the radiator 12 are spaced from each other in the vehicle forward-rearward direction and, in this state, are coupled together by means of a bracket 20 formed by a resin, for example. The condenser 14 and the radiator 12 are then attached, via this bracket 20, to a radiator support 16.

The vehicle cooler 10 further includes a fan shroud 18 behind the radiator 12. A radiator fan (not shown) is attached to the fan shroud 18. The fan shroud 18 is also attached, via the bracket 20, for example, to the radiator support 16.

Figure 3:
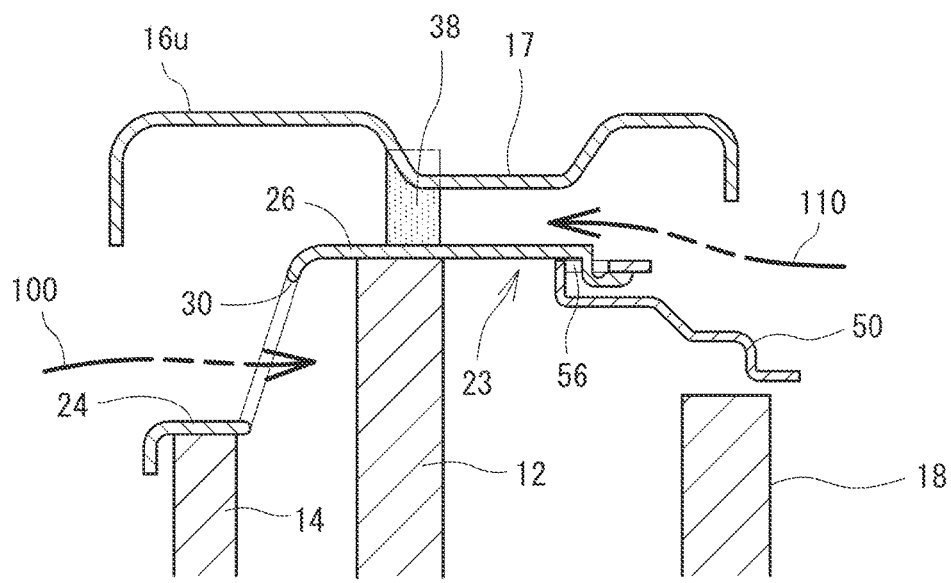
FIG. 3 is an end elevation taken on a plane through an air hole.
Figure 4:
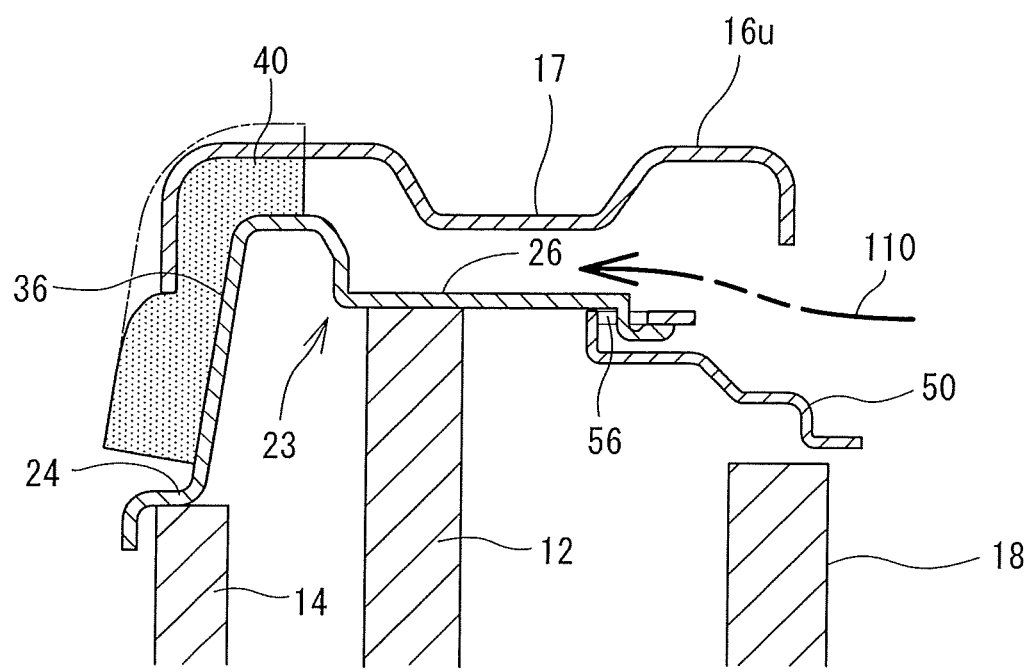
FIG. 4 is an end elevation taken on a plane through a second sealing member.

The radiator support 16 supports the condenser 14 and the radiator 12. Among various possible configurations of the radiator support 16, the radiator support 16 according to the present embodiment includes an upper support 16u and a lower support 161 disposed above and below the condenser 14 and the radiator 12, respectively. While FIG. 1 illustrates the upper support 16u as a planer plate for the purpose of simplification, the upper support 16u actually includes a bead 17 extending in the vehicle width direction as illustrated in FIG. 3 and FIG. 4, so that the upper support 16u includes a lower-height portion substantially directly above the radiator 12.

A small gap is present between the upper support 16u and the top surfaces of the condenser 14 and the radiator 12. In this embodiment, an air guide 22 is disposed in this gap. The air guide 22 prevents hot air in the power unit chamber from flowing into the forward part of the vehicle cooler 10. The vehicle cooler 10 includes, in the rear portion, power units that generate heat when they are driven, such as an engine and a motor. Hot air generated around these power units, when entering the forward portion of the vehicle cooler 10, lowers the cooling efficiency of the condenser 14 and the radiator 12. The vehicle cooler 10 of the present embodiment therefore includes the air guide 22 between the condenser 14 and the radiator 12, and the upper support 16u.

Figure 2:
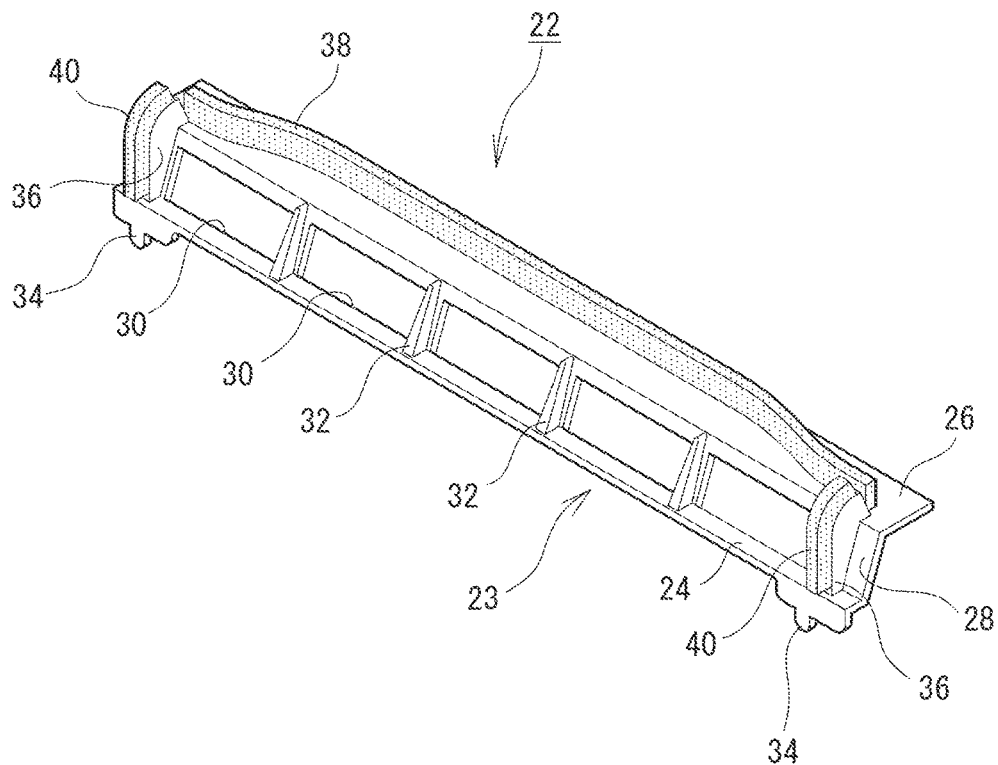
FIG. 2 is a perspective view of an air guide.

The structure of the air guide 22 will be described in detail with reference to FIG. 2 to FIG. 4. FIG. 2 is a perspective view of the air guide 22. FIG. 3 and FIG. 4 are end elevations of the vehicle cooler 10 at the height around the air guide 22: FIG. 3 is an end elevation taken on a plane crossing an air hole 30 and FIG. 4 is an end elevation taken on a plane crossing a second sealing member 40.

The air guide 22 typically includes two parts: a body part 23 formed of a resin, for example, and sealing members 38 and 40 attached to the body part 23. The body part 23 extends to lie over the top surface of the condenser 14 and the top surface of the radiator 12. The dimension of body part 23 in the vehicle width direction is substantially the same as the dimensions of the condenser 14 and the radiator 12 in the vehicle width direction. The body part 23 further includes a first base face 24 placed on the top surface of the condenser 14, a second base face 26 placed on the top surface of the radiator 12, and a standing wall 28 coupling the first base face 24 and the second base face 26. As described above, as the top surface of the radiator 12 is higher than the top surface of the condenser 14, the second base face 26 placed on the top surface of the radiator 12 is higher than the first base face 24 placed on the top surface of the condenser 14. The body part 23 including the first base face 24 and the second base face 26 coupled with each other by the standing wall 28 has a step shape, as a whole.

The air guide 22 further includes fitting portions 34 protruding downward near both ends of the first base face 24 in the vehicle width direction. The fitting portions 34 are inserted into and fitted in corresponding fitting holes 54 forming in the bracket 20 (see FIG. 1). The air guide 22 is thus attached to the condenser 14. The rear end of the second base face 26 is coupled to a cover member 50 covering the top surface of the fan shroud 18 (see FIG. 3 and FIG. 4). The cover member 50 therefore includes an engagement hole 56 into which the rear end of the second base face 26 is inserted. The rear end of the second base face 26 is inserted into this engagement hole 56.

The standing wall 28 couples the rear end of first base face 24 and the front end of the second base face 26, and faces the front surface of radiator 12 with respect to the vehicle forward-rearward direction. The standing wall 28 includes air holes 30 for guiding the outside air entering from the front grill to the front surface of the radiator 12. The air holes 30 are disposed to expose the front surface of the radiator 12 to fresh air 100. The air holes 30 allows the radiator 12 to be exposed to a greater amount of fresh air 100 to thereby increase the cooling efficiency of the radiator 12. It is desirable to form the greatest possible number of air holes 30 which are as large as possible within a range in which the air guide 22 can maintain its rigidity.

In this example, a plurality of (five in the illustrated example) air holes 30 are arranged at equal intervals in the vehicle width direction. Each air hole 30 extends from a position slightly below the upper end of the standing wall 28 to the lower end of the standing wall 28. The dimension of the air hole 30 in the vehicle width direction is sufficiently greater than the dimension of a connecting portion between the air holes 30 in the vehicle width direction. The standing wall 28 has a ladder shape as a whole. The connecting portions include ribs 32 protruding forward and extending along the entire height of the standing wall 28. The rib 32 increases the strength of the body part 23. The body part 23 thus having an increased strength increases the area of the air hole 30 to thereby further increase the cooling efficiency of the radiator 12.

As is clearly illustrated in FIG. 2, the standing wall 28 is gradually inclined forward from the front end of the second base face 26 as it extends downward. The standing wall 28 which is inclined in this manner can provide a larger opening area of the air hole 30 to thereby achieve the higher cooling efficiency of the radiator 12 as compared to the standing wall 28 configured as a vertical wall.

The body part 23 includes end beads 36 that are partially swollen at both ends in the vehicle width direction. The end bead 36 extends from a portion near the front end of the first base face 24 along the standing wall 28. The end bead 36 includes a second sealing member 40, which will be described below.

A first sealing member 38 is disposed on the second base face 26; that is, further backward in the vehicle from the air holes 30. The first sealing member 38 fills and seals a gap between the body part 23 (second base face 26) and the upper support 16u (radiator support), and is formed of a flexibly deformable elastic material, such as sponge, rubber, or a rubber foaming member, for example. The height of the first sealing member 38 in a no-load state (before assembling the air guide 22) is sufficiently greater than the distance between the second base face 26 and the upper support 16u. FIG. 3 illustrates the shape of the first sealing member 38 in the no-load state by a thin dashed and double-dotted line. When the air guide 22 and the upper support 16u are assembled in the vehicle cooler 10, the first sealing member 38 flexibly deforms to conform to the shape of the upper support 16u and reliably fills the gap between the upper support 16u and the second base face 26. The first sealing member 38 thus prevents the hot air 110 flowing from the rearward portion from passing through the gap, thereby increasing the cooling efficiency of the condenser 14 and the radiator 12.

As clearly illustrated in FIG. 2, the first sealing member 38 has both ends in the vehicle width direction protruding forward to have a curved shape in a top view. This curved shape lowers the possibility of inclination (buckling) of the first sealing member 38 and further increases the reliability of sealing.

The second sealing member 40 is disposed on top surface of the end bead 36. The second sealing member 40, similar to the first sealing member 38, is formed of a flexibly deformable elastic material, such as sponge, rubber, or a rubber foaming member, for example. The second sealing member 40, similar to the first sealing member 38, fills and seals the gap between the body part 23 and the upper support 16u. FIG. 4 illustrates the shape of the second sealing member 40 in the no-load state by a thin dashed and double-dotted line. However, while the first sealing member 38 mainly blocks the hot air 110 flowing from the rearward portion toward the front portion of the vehicle, the second sealing member 40 blocks the hot air 110 flowing from outside toward inside in the vehicle width direction. The second sealing member 40 therefore extends, similar to the end bead 36, from a portion near the front end of the first base face 24 along the standing wall 28. As illustrated in FIG. 4, the second sealing member 40 fills not only the gap between the bottom of the upper support 16u and the body part 23 but also the gap between the front end face of the upper support 16u and the body part 23. Such second sealing members 40 thus disposed on both ends of the body part 23 in the vehicle width direction to extend in the frontward-rearward direction prevent entry of the hot air flowing sideways to thereby further increase the cooling efficiency of the vehicle cooler 10.

While an example structure has been described above, the structure may be modified as appropriate into any structures having a step shape, in which at least the body part 23 of the air guide 22 absorbs the difference in heights between the top surface of the condenser 14 and the top surface of the radiator 12, and the standing wall 28 of the body part 23 includes the air holes 30 for guiding the outside air to the front surface of the radiator 12. Therefore, the shape and the number of the air holes 30, for example, may be changed as appropriate. For example, the air holes 30 may be grating holes as in the front grill. The air guide 22 that can secure sufficiently large air holes 30 while maintaining the strength of the body part 23 does not necessarily include the ribs 32. The standing wall 28 need not be inclined. The shape and the position of the first and second sealing members 38 and 40 which can prevent entry of the hot air may also be modified as appropriate. Further, while in the above example, the air guide is disposed only on the radiator 12 and the condenser 14, the air guide may be disposed on the sides of or below the radiator 12 and the like. Of course, the air guide disposed on the sides of or below the radiator 12 has a shape and structure that are different from those of the air guide which is described above in the specification.

The invention claimed is:

1. A vehicle cooler comprising:
   a radiator;
   a condenser disposed in front of the radiator, the condenser having a top surface located lower than a top surface of the radiator; and
   an air guide extending from the top surface of the radiator over the top surface of the condenser, wherein
   the air guide includes a body part, the body part comprising:
   a first base face placed on the top surface of the condenser;
   a second base face placed on the top surface of the radiator; and
   a standing wall extending in a height direction of a vehicle to couple the first base face and the second base face, the standing wall facing a front surface of the radiator in a forward-rearward direction of the vehicle, the standing wall including at least one air hole configured to guide outside air to the radiator,
   the vehicle cooler further comprises a radiator support disposed above the top surface of the radiator and the top surface of the condenser, the radiator support being spaced from the top surfaces with a gap between the radiator support and the top surfaces,
   the air guide further comprises a first sealing member disposed on the second base face and extending in a width direction of the vehicle, the first sealing member comprising an elastic material to fill a first gap between the second base face and the radiator support, and the air guide further comprises second sealing members extending in the forward-rearward direction of the vehicle in end portions of the body part in the width direction of the vehicle, the second sealing members comprising an elastic material to fill a second gap between the end portions of the body part and the radiator support.

2. The vehicle cooler according to claim 1, wherein the at least one air hole comprises a plurality of air holes, the standing wall comprises the plurality of air holes arranged at intervals in the width direction of the vehicle, and the standing wall comprises a rib between adjacent air holes, the rib protruding in the forward-rearward direction of the vehicle.

3. The vehicle cooler according to claim 1, wherein the standing wall is inclined gradually forward as the standing wall extends downward from a front end of the second base face.

\* \* \* \* \*